United States Patent [19]
Nomura et al.

[11] 3,871,011
[45] Mar. 11, 1975

[54] EXPOSURE CORRECTION INDICATOR

[75] Inventors: Katsuhiko Nomura; Hiroshi Kurei; Fumio Urano, all of Saitama-ken, Japan

[73] Assignee: Asahi Kogaku Kogyo Kabushiki Kaisha, Tokyo-to, Japan

[22] Filed: Mar. 20, 1974

[21] Appl. No.: 452,971

[30] Foreign Application Priority Data
Mar. 26, 1973  Japan.............................. 48-35422

[52] U.S. Cl.................. 354/152, 354/155, 354/289
[51] Int. Cl......................... G03b 7/00, G03b 17/20
[58] Field of Search......... 354/152, 36, 53, 54, 155, 354/289

[56] References Cited
UNITED STATES PATENTS

| 3,153,994 | 10/1964 | Rentschler | 354/54 |
| 3,590,703 | 7/1971 | Ono | 354/155 X |
| 3,668,993 | 6/1972 | Kurie | 354/155 |

Primary Examiner—Richard A. Wintercorn
Attorney, Agent, or Firm—Christie, Parker & Hale

[57] ABSTRACT

In a single lens reflex camera having a through-the-lens automatic exposure system, there is provided an arrangement for indicating a manually selected degree of exposure correction.

2 Claims, 3 Drawing Figures

EXPOSURE CORRECTION INDICATOR

BACKGROUND OF THE INVENTION

This invention relates to single lens reflex cameras of the type having a viewfinder, a lens diaphragm ring, and a through-the-lens (TTL) automatic exposure control system, and, particularly, to cameras of this type in which the exposure control system has a manually adjustable mode of operation.

Cameras, such as single lens reflex cameras, having adjustable aperture diaphragms and adjustable exposure-time shutters can be used to take pictures under widely varying lighting conditions. For proper exposure of the film, it is required that in combination the appropriate adjustments be made to the diaphragm aperture size and to the shutter exposure time so as to admit the appropriate amount of light for the particular film speed (ASA) of the film exposed.

An automatic exposure control electric shutter facilitates this task. Generally, exposure time is automatically determined on the basis of three factors, these being the luminance of the photographic subject, the diaphragm aperture, and the film sensitivity. These factors are usually converted into separate electric quantities for use in connection with the operation of an electric circuit that is activated during a subsequent photographing operation.

Often, a particular photographic subject is in part brightly lighted and in part in shadow. An extreme example of this is a skier facing the camera with bright sunlight reflecting from the surrounding snow into the camera. Being such a strongly back-lighted subject, the skier's face will be drastically underexposed if automatic exposure control is effected in accordance with the total amount of light reflected from the subject and the background. The opposite extreme from the foregoing is a brightly lighted subject against a very dark background as, for example, a person standing in the shade of a tree but whose face is brightly lighted by a shaft of light passing between tree branches. In circumstances such as this, if automatic exposure control is effected in accordance with the total amount of light, the person's face will be overexposed. Accordingly, it is well known that it is often advisable to render an exposure correction.

Among the general approaches that have been taken in connection with exposure correction is a technique involving measuring the luminance of a selected spot rather than measuring the total luminance of the subject and the background. This is sometimes called a spot meter technique in contrast to an averaging meter technique. In circumstances where the subject is back-lighted, the spot that is considered is a shadow spot. The luminance of the shadow spot is measured and memorized in a circuit before the picture is taken. In another approach, exposure correction is effected by adjusting the indicated film speed. For example, consider the effect of actually using ASA 200 film, but indicating by way of a corresponding electric quantity that ASA 100 film is being used. In this circumstance, an averaging meter system will admit such additional amount of light that would be necessary for the slower speed ASA 100 film and, consequently, shadow areas will be better exposed. The foregoing is an example of a "single-stop" correction, and is in a direction favoring shadows. By "single-stop" is meant a correction involving admitting either one-half of or twice the amount of light admitted without correction. A two-stop correction would involve either one-fourth [i.e., $(\frac{1}{2})^2$] or quadruple [i.e., $(2)^2$] the uncorrected amount of light. The more or less drastic variation in lighting of different parts of an area, a correspondingly different number of correction stops are advisable. The above-described methods are already known and in use. One of these methods is disclosed in our copending U.S. Pat. application Ser. No. 425,808 filed Dec. 18, 1973. However, practical problems attend the use of either of them. For example, when a photographer effects a correction for one picture as by adjusting the film speed indicator, he often forgets about this when he takes his next picture and, accordingly, an unwanted correction results.

SUMMARY OF THE INVENTION

This invention is directed to an improvement in single lens reflex cameras of the type wherein the information about the aperture value is memorized in the electric shutter circuit and the aperture is varied depending on the memorized informations. In an important feature of the invention the degree of exposure correction, effected by adjustment of the diaphragm ring, is indicated in the view finder so that the photographer can recognize the same by looking into the viewfinder.

The apparatus of this invention is embodied in a single lens reflex camera of the type having a viewfinder, a lens diaphragm ring, and a TTL automatic exposure control system. The control system is arranged to be operated manually and externally of the camera to memorize at least the electric quantities corresponding to the luminance of a photographic subject and to the diaphragm aperture. The apparatus includes an indicating device viewable through the viewfinder. The indicating device includes a rotatable indicator element, such as a dial having indicia on its periphery, that is rotatable from a normal position into a position indicative of a degree of manually selected exposure correction. Biasing means are provided to urge the rotatable element in the direction of rotation toward the normal position. A manual memory operation lever is rotatable between a manual memory position and a released position. Means are provided, including a clutch mechanism, for selectively connecting the diaphragm ring to the rotatable indicator element. The clutch mechanism is operated by the manual memory operation lever. When the manual memory operation lever is in the manual memory position, the clutch mechanism effects a connection such that rotation of the diaphragm ring causes rotation of the rotatable indicator element. Preferably, a drive gear is connected to be rotatable with the diaphragm ring and a follower gear is connected so that the rotatable indicator element rotates with it. In this preferred arrangement, the clutch mechanism includes an idler gear movable into a position to form a gear train for coupling rotation of the drive gear to the follower gear.

DETAILED DESCRIPTION

Figure 1:
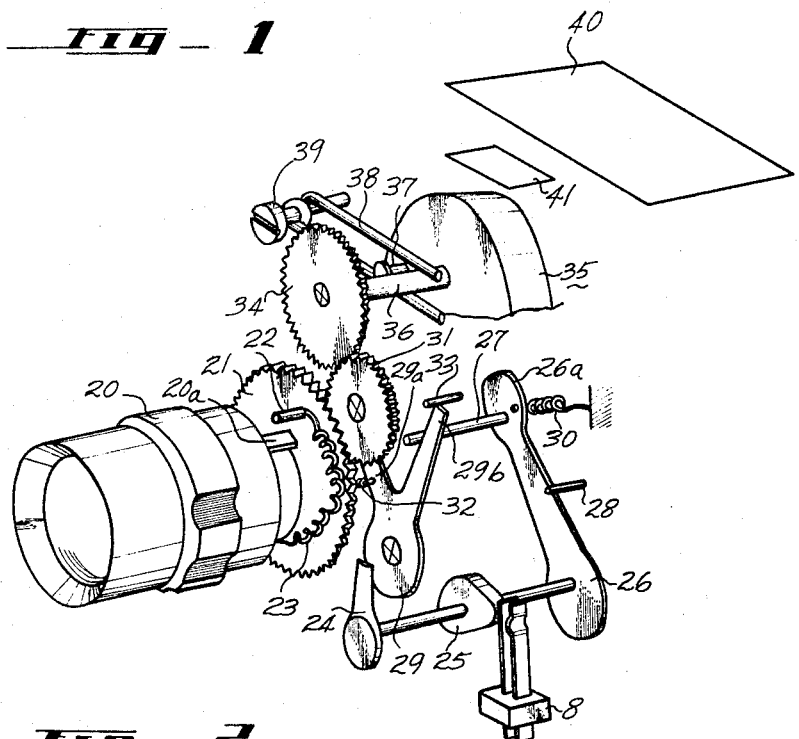
FIG. 1 is a perspective view of apparatus adapted to be embodied in a single lens reflex camera and embodying the present invention.

First, reference should be made to FIG. 1 wherein indicated at 20 is a lens diaphragm ring. When the lens diaphragm ring 20 is rotated, the movement thereof is transmitted to a drive gear 21 by way of abutting engagement between a projection 20a integrally formed on the diaphragm ring 20 and a pin 22 projecting from the drive gear. A biasing spring 23 is provided to urge the projection 20a and the pin 22 into engagement. The diaphragm ring 20 is associated as is conventional with a resistor (not shown) which is adapted to apply an aperture value information to the electronic shutter circuit and with diaphragm blades (not shown) adapted to regulate the quantity of the light falling on the film upon shutter releasing operation.

Indicated at 24 is a manual memory operation lever arranged externally of the camera. The manual memory operation lever 24 is ganged with an insulator cam 25 and a drive lever 26 (which will be detailed later) so that they rotate together in the same direction. A follower lever 29 is associated with the drive lever 26 by means of a pin 27 carried on the forward end 26a of the drive lever 26. An idle gear 31 is rotatably carried on one end of the follower lever 29. A spring 30 normally urges the drive lever 26 clockwise as viewed in FIG. 1 and a spring 32 urges the follower lever 29 counterclockwise. The spring 30 is set in such a manner that it has a force of action much larger than that of the spring 32. Accordingly, when no external force is applied to the manual memory operation lever 24, the lever 24, insulator cam 25, drive lever 26 and follower lever 29 are urged clockwise as viewed in the Figure and the drive lever 26 is pressedly engaged with a stop pin 28 fixedly mounted on the camera body. Indicated at 33 is a stop pin 33 fixedly mounted on the camera body. Stop pins 28 and 33 serve as travel limits preventing rotation beyond preselected angles. Indicated at 34 is a follower gear connected with an exposure correction indicator dial 35 by means of a shaft 36. The follower gear 34 is normally maintained in a preselected position by biasing means comprising a restoring spring 38 and operates, by way of an idle gear 31, in association with the drive gear 21. The idle gear 31 acts as clutch means which, in association with the operation of the manual memory operation lever 24, serves to operationally connect or disconnect the diaphragm ring and the indicator dial. The restoring spring 38 serves as means for restoring the indicator dial 35 to its original or normal position. Indicated at 37 is a pin fixed on the indicator dial 38 and adapted to transmit the force of action of the restoring spring 38 to the indicator dial 35. Indicated at 39 is a shaft for supporting the restoring spring 38 and at 40 is a finder field frame. Outside of the frame 40 is arranged a window 41 in such a manner that, each time, one of the indicia or symbols, for example symbol X2, marked on the indicator dial 35 can be seen in the viewfinder.

Now the operation of the foregoing arrangement will be described. When the manual memory operation lever 24 is externally rotated counterclockwise, a manual memory switch 8 is opened by means of the insulator 25, so that the relation between the shutter speed and the aperture diaphragm which has been set before operation of the lever 24 is maintained even after the manual memory switch 8 is opened, but the electrical light measurement is not performed. At the same time, the drive lever 26 rotates counterclockwise, thereby permitting the follower lever 29 to be rotated counterclockwise by the action of the spring 32. Consequently, the drive gear 21 is operationally connected with the follower gear 34 by way of the idle gear 31 (FIG. 2), bringing the diagram ring 20 into association with the indicator dial 35.

Figure 2:
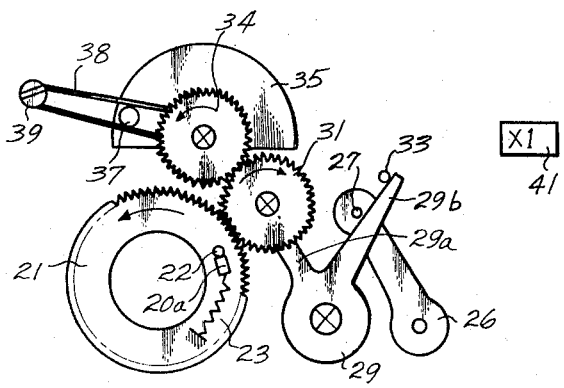
FIG. 2 is a front view of the main portion of the apparatus shown in FIG. 1, the parts being shown in a position incident to a manual exposure correction operation.

In the position shown in FIGS. 1 and 2 symbol X1 is seen in the window 41 of the viewfinder. Symbol X represents an initial aperture degree set by a position of the diaphragm ring 20 in FIG. 1. Symbol X1 is one time of the X and symbol X2 is twice the X value which are indicated in the viewfinder 41 respectively by co-operation of the diaphragm ring 20 and the indicator dial 35. This is because the restoring spring 38 serves as a stopper for the pin 37 and holds the shaft 36 of the indicator dial 35 in a predetermined position. Under these conditions when the lens diaphragm ring 20 is rotated, for example, counterclockwise by one graduation (that is, in the Figures in the direction to reduce the diaphragm aperture by one graduation), the gears 21, 31 and 34 rotate in the direction of arrows as shown in FIG. 2, so that the indicator dial 35 rotates counterclockwise against the action of the spring 38 to the position shown in FIG. 3. At this time symbol X1/2 ($-1E_V$) can be seen in the viewfinder.

Figure 3:
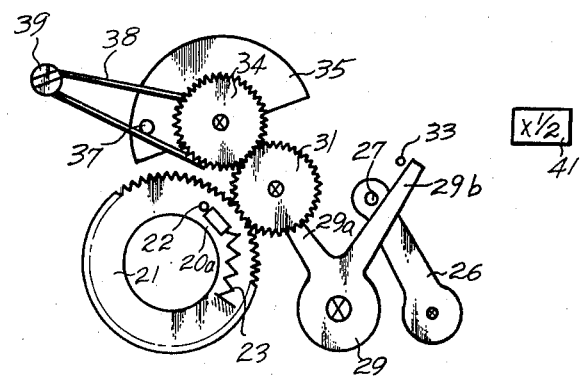
FIG. 3 is a view similar to that of FIG. 2, but illustrates another operational position.

Under these conditions when the external force acting on the manual memory operation lever 26 is removed, the lever 24, insulator cam 25 and drive lever 26 are rotated clockwise as viewed in the Figures by the action of the spring 30. The follower lever 29 is also rotated clockwise by the pin 27 against the action of the spring 32, and the idle gear 31 is disengaged from both the drive gear 21 and follower gear 34, thereby decoupling the diaphragm ring 20 from the indicator dial 35. In this position the restoring spring 38 is acting on the pin 37 arranged on the indicator dial 35 as shown in FIG. 3, so that the indicator dial 35 is rotated clockwise as viewed in FIG. 3 until the restoring spring 38 is in contact with the shaft 36. Since the indicator dial 35 is so arranged that symbol X1 can be seen in the viewfinder window 41 under these conditions, there is no danger that the photographer makes an error operation forgetting that the shutter is set in the exposure correction mode.

Although the shown and described embodiment is so arranged as to disengage the idle gear 31 by externally operating the manual memory operation lever 24, the idle gear 31 may be replaced by other means such as a roller and belt. Also a combination of a scale marked by a series of figures and an indicator needle movably arranged over the scale may be used in place of the indicator dial 35. It will be apparent to those skilled in the art that the foregoing arrangement of the exposure correction indicator of this invention may be modified variously to attain the purpose of this invention that, only when the manual memory operation lever 24 is set in a manual memory position by application of an external force, the lens diaphragm ring 20 and the exposure correction indicator dial 35 are brought into association with each other and the degree of exposure correction is indicated in the viewfinder window in association with the movement of the diaphragm ring 20.

To apply an external force the manual memory operation lever 24 may be kept pressed with a finger or may be locked in an urged position by means of an additional locking mechanism.

According to this invention the lens diaphragm ring 20 and the exposure correction indicator dial 35 can be disengageably associated with each other by way of a clutch mechanism which can be actuated externally of the camera by means of the manual memory operation lever 24. When the lever 24 is set in the manual memory position, the diaphragm ring 20 is in association with the indicator dial 35 and when the lever 24 is out of the memory position, these members 20 and 35 are decoupled from each other. In this way the degree of exposure correction may be known easily in association with the movement of the diaphragm ring 20. Since the indicator dial 35 is so arranged as to be restored, upon releasing the manual memory operation lever 24, to the original indication position by the restoring mechanism, any possible danger that the photographer forgets his camera being set in an exposure correction mode and operates it falsely.

Therefore, according to this invention the various photographic factors such as the luminance of the photographic subject, the aperture diaphragm and the film sensitivity are determined first, and under that condition the manual memory switch 8 is opened to make an exposure correction solely by varying the aperture diaphragm to thereby indicate in the viewfinder 41 the exposure values of 2, 4, ½ and ¼ times respectively of an initial exposure value determined by the electric exposure circuit. At this time, the electric light measurement device is, of course, inoperative.

What is claimed is:

1. In a single lens reflex camera having a viewfinder, a lens diaphragm ring, and a through-the-lens automatic exposure control system arranged to be operated manually and externally of the camera to memorize at least the electric quantities corresponding to the luminance of a photographic subject and to the diaphragm aperture, the combination comprising an indicating device viewable through the viewfinder, the indicating device including a rotatable indicator element for rotation from a normal position into a position indicative of a degree of manually selected exposure correction;

biasing means for urging the rotatable element in the direction of rotation toward the normal position;

a manual memory operation lever rotatable between a manual memory position and a release position; and means, including a clutch mechanism, for selectively connecting the diaphragm ring to the rotatable indicator element, the clutch mechanism being operated in response to the manual memory operation lever such that the diaphragm ring and the rotatable indicator element are connected or disconnected in accordance with whether the manual memory operation lever is in the manual memory position or in the released position respectively, and wherein rotation of the diaphragm ring causes rotation of the rotatable indicator element owing to the connection effected therebetween by the clutch mechanism when the manual operation lever is in the manual memory position.

2. A combination according to claim 1 wherein the means for selectively connecting includes a drive gear connected to be rotatable with the diaphragm ring, a follower gear connected so that the rotatable indicator element rotates with it, and wherein the clutch mechanism includes an idler gear movable into a position to form a gear train for coupling rotation of the drive gear to the follower gear.

* * * * *